United States Patent
Sasaoka et al.

(10) Patent No.: US 6,661,954 B2
(45) Date of Patent: Dec. 9, 2003

(54) OPTICAL TRANSMISSION LINE INCLUDING A CONNECTED PART OF OPTICAL FIBERS AND CONNECTING METHOD

(75) Inventors: Eisuke Sasaoka, Yokohama (JP); Takemi Hasegawa, Yokohama (JP); Shinji Ishikawa, Yokohama (JP); Masashi Onishi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 89 days.

(21) Appl. No.: 10/061,210

(22) Filed: Feb. 4, 2002

(65) Prior Publication Data

US 2002/0106164 A1 Aug. 8, 2002

(51) Int. Cl.⁷ .................................. G02B 6/42
(52) U.S. Cl. ..................... 385/39; 385/50; 385/60; 385/80; 385/98
(58) Field of Search ................. 385/39, 49, 50, 385/51, 52, 60, 80, 98, 123, 125

(56) References Cited

U.S. PATENT DOCUMENTS 6,512,871 B2 * 1/2003 Kumel et al. ............... 385/123
2003/0031443 A1 * 2/2003 Soljacic et al. ............. 385/125

FOREIGN PATENT DOCUMENTS

JP          3072842       2/2000

\* cited by examiner

*Primary Examiner*—Hemang Sanghavi
(74) *Attorney, Agent, or Firm*—McDermott, Will & Emery

(57) ABSTRACT

Provided are an optical transmission line including a connected part of the optical fibers having different refractive index profiles, wherein at least one of the optical fibers has a hollow region, and a method for connecting such optical fibers, wherein connection loss in a connection of such optical fibers is reduced. In the case of connecting an optical fiber 1, which does not have a hollow region and which consists of a core region 3 and a cladding region 4, and an optical fiber 2, which consists of a hollow core region 5 and a cladding region 6 having a plurality of refractive index variation parts 7 which extend along optical fiber 2, matching oil M is first injected into the connecting end portion of the hollow core region 5 to be connected with the optical fiber 1.

The matching oil M is a substance that has a matched refractive index greater than the refractive index of the material which forms the cladding region 6. Subsequently, one end portion of the optical fiber 1 and the connecting end portion of the optical fiber 2, wherein the matching oil M is injected, are inserted into the glass pipe 8, and the optical fiber 1 and the optical fiber 2 are connected.

10 Claims, 6 Drawing Sheets

OPTICAL TRANSMISSION LINE INCLUDING A CONNECTED PART OF OPTICAL FIBERS AND CONNECTING METHOD

BACKGROUND OF THE INVENTION

1. Field of the Invention

The present invention relates to an optical transmission line including a connected part of optical fibers and a method of connecting optical fibers at least one of which has a hollow region.

2. Description of the Background Art

Japanese patent 3072842 discloses a single-mode optical fiber having a core which is hollow (hollow core) and a cladding which is provided around the core and which has a photonic band gap structure, such that light propagates by means of the Bragg reflection from the diffraction grating.

The optical fiber is occasionally connected with a usual optical fiber having a core whose refractive index is greater than the refractive index of the cladding, for the purpose of optical communication or light signal processing. Because of the difference in the mechanism for guiding light between a usual optical fiber and an optical fiber having a hollow core, the field intensities of the propagated light are substantially different. Accordingly, the connection loss increases in the case in which their connection is made only by butting the optical fiber having a hollow core and the usual optical fiber. However, in the disclosure of the Japanese patent, no consideration is given at all with respect to connection.

SUMMARY OF THE INVENTION

An object of the present invention is to reduce connection loss in a connection of optical fibers having different refractive index profiles, at least one of which has a hollow region.

In order to achieve such object, an optical transmission line includes a connected part which is provided for connecting a first optical fiber having a first core region and a first cladding region with a second optical fiber having a second core region and a second cladding region, wherein either or both of the second core region and the second cladding region has a hollow region which extends along the second optical fiber and the connected part of the hollow region is provided with a refractive index matched substance the refractive index of which is greater than that of the hollow region. Here, "a refractive index matched" means "a refractive index is adjusted to become approximately equal to the refractive index of the silica glass".

In one embodiment, the cross-sectional area of the substance on a plane which is perpendicular to the longitudinal axis of the second optical fiber may decrease continuously as it is more distanced from the connected end face of the second optical fiber. The substance may be liquid. The liquid may be hardened after the connection work. The hardened substance may also be filled between the connected end of the first optical fiber and the connected end of the second optical fiber. The connected part may be provided with a member for reinforcing the connection.

A connecting method is also provided for connecting the first optical fiber and the second optical fiber in an optical transmission line, in which method a refractive index matched substance having a refractive index which is greater than that of the hollow region is put in the connecting end portion of the hollow region of the second optical fiber connected with the first optical fiber.

The present invention is further explained below by referring to the accompanying drawings. The drawings are provided solely for the purpose of illustration and are not intended to limit the scope of the invention.

BRIEF DESCRIPTION OF THE DRAWINGS

FIG. 4A shows a refractive index profile of an optical fiber 1, FIG. 4B shows that of an optical fiber 2 in the state illustrated in FIG. 3A, and FIG. 4C shows that of the connected end face of the optical fiber 2 in the state illustrated in FIG. 3C.

FIG. 8A shows the refractive index profile of the optical fiber 1, FIG. 8B shows that of optical fiber 2 taken along the line VII—VII in FIG. 6, and FIG. 8C shows that of optical fiber 2 taken along the line VIII—VIII in FIG. 6.

DETAILED DESCRIPTION OF THE INVENTION

Figure 1:
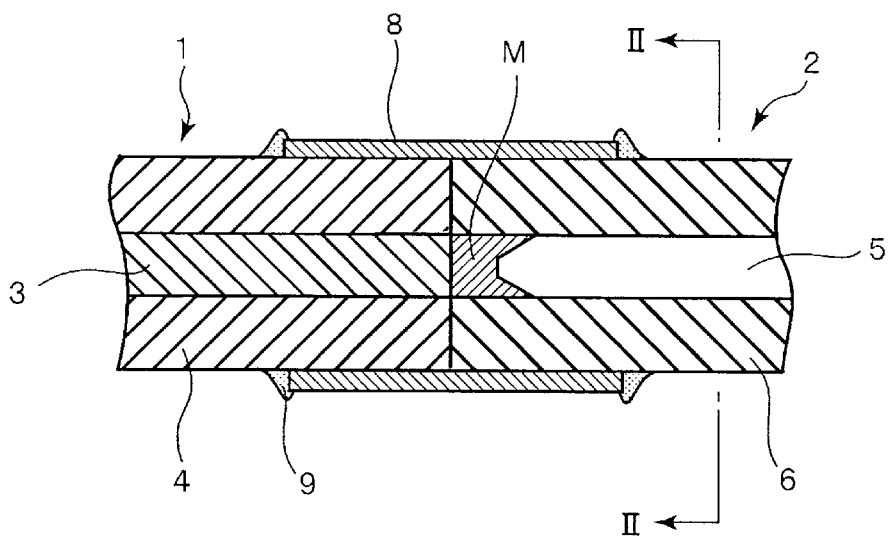
FIG. 1 is a sectional view showing a connected part of optical fibers in an optical transmission line according to a first embodiment of the present invention.

Embodiments of the present invention are explained below by referring to the accompanying drawings. In the drawings, the same number bears the same sign to avoid duplicate explanation. The ratios of the dimensions in the drawings do not necessarily coincide with the explanation.

First, a first embodiment of the present invention of a connected part of optical fibers in an optical transmission line will be explained. FIG. 1 is a sectional view showing the embodiment. In this embodiment, an optical fiber 1 and an optical fiber 2 are connected.

Figure 4A:
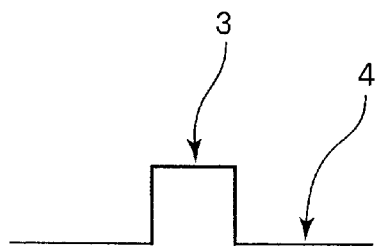
FIGS. 4A through 4C show the refractive index profiles of the two optical fibers of FIG. 1.

The optical fiber 1 is an optical silica glass fiber that does not include a hollow region and consists of a core region 3 and a cladding region 4 surrounding the core region. The core region 3 is doped with $GeO_2$ and the like, and the refractive index of the core region 3 is greater than that of the cladding region 4 (FIG. 4A). In the optical fiber 1, incident light is confined to the core region 3 by a refractive index difference between the core region 3 and the cladding region 4 and propagates through the optical fiber 1.

Figure 4B:
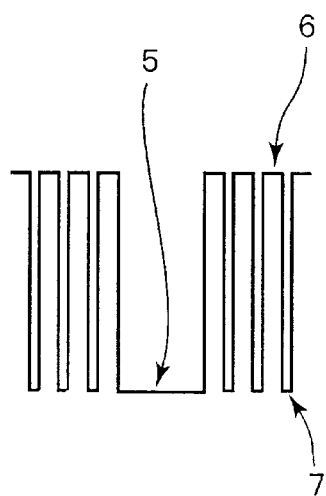

The optical fiber 2 consists of a core region having a hollow structure (hereinafter, the "hollow core region") 5 and a silica glass cladding region 6 which is formed around the hollow core region 5, and the refractive index of the hollow core region 5 is smaller than that of the cladding region 6 (FIG. 4B). The outer diameter (the outer diameter of the cladding region 6) of the optical fiber 2 is 125 $\mu$m which is the same as that of the optical fiber 1. The outer diameter of the hollow core region 5 is equal to that of the core region 3.

Figure 2:
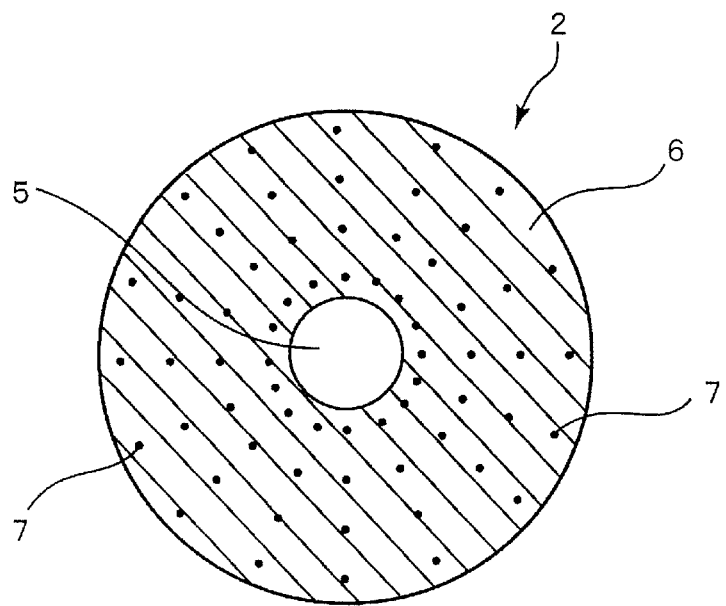
FIG. 2 is a sectional view taken along the line II—II of FIG. 1.

A plurality of refractive index variation parts 7 which are radially arranged in the section of the cladding region 6 as shown in FIG. 2 extend along the optical fiber 2. The refractive index variation parts 7 afford periodic modulation to the refractive index of the cladding region 6. The refractive index variation part 7 may be a cavity or made of a rod that is doped with a dopant having a given refractive index and embedded in the cladding region 6. Of the light that is incident on the optical fiber 2, light with a specific wavelength is selectively confined to the hollow core region 5 by the Bragg reflection from the cladding region 6 and propagates therethrough. Using the optical fiber 2 results in a reduction of the influence of nonlinear optical effect and a large variation of waveguide dispersion.

Figure 3A:
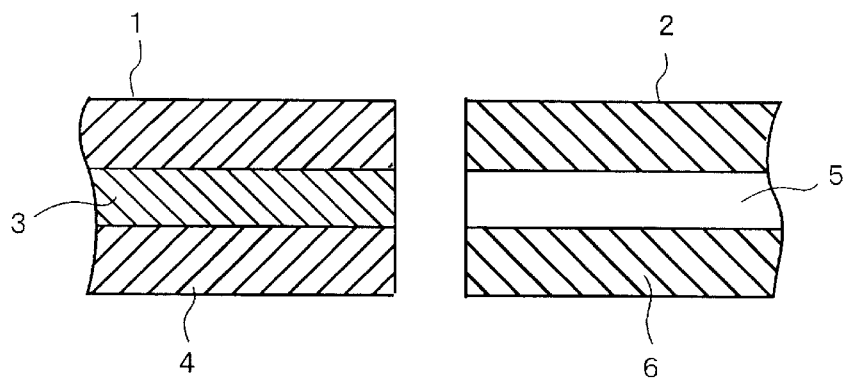
FIGS. 3A through 3C show a method for connecting the two optical fibers of FIG. 1.
Figure 3B:
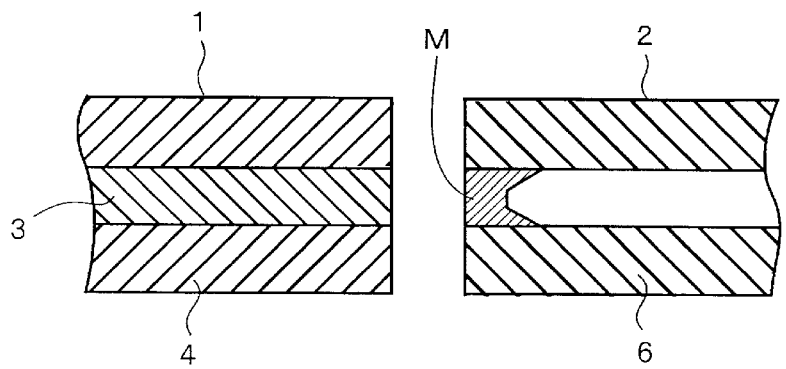
Figure 3C:
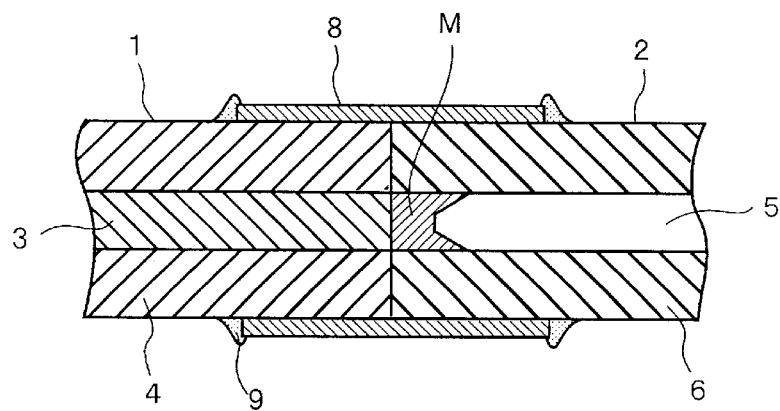

Referring to FIGS. 3A through 3C a process for connecting the optical fiber 1 and the optical fiber 2 will be explained in the following.

First, the optical fibers 1 and 2 are prepared (FIG. 3A). Then, matching oil M is injected into the end portion of the hollow core region 5 on the side to be connected with the optical fiber 1 (FIG. 3B). The matching oil M is a substance having a refractive index which is greater than that of a medium forming the cladding region 6. The refractive index of the matching oil M is such that the power distributions of the light at the respective connected end faces of the optical fibers 1 and 2 become approximately equal. For example, the relative refractive index difference between the matching oil M and the material of the cladding region 6 is in the range of 0.3 to 0.5%.

In this embodiment, since the liquid matching oil M is used as a substance whose refractive index is matched, it is easy to inject the substance having a matched refractive index into the hollow core region 5. At the time when the matching oil M has been injected into the end portion of the hollow core region 5, it has some degree of viscosity and hence it is maintained as it is at the end portion of the hollow core region 5. At that time, due to the surface tension of the matching oil M, the cross-sectional area of the matching oil M on a plane which is perpendicular to the longitudinal axis of the optical fiber 2 decreases continuously as it is more distanced from such connecting end of the optical fiber 2 as to be connected with the optical fiber 1.

Next, one end portion of the optical fiber 1 and the end portion of the optical fiber 2 into which the matching oil M has been injected are inserted into a glass pipe 8 that is used as a reinforcement member, and the end face of the optical fiber 1 and the end face of the optical fiber 2 are butted together each other (FIG. 3C). Thus, the matching oil M filled in the end portion of the hollow core region 5 contacts the end face of the core region 3. Preferably, the glass pipe 8 is made of a material which has a coefficient of linear expansion equal to or smaller than that of silica glass. The internal diameter of the glass pipe 8 is about 127 μm.

Subsequently, the two end portions of the glass pipe 8 and the optical fibers 1 and 2 are fixed together with an adhesive 9, or the like. Accordingly, the optical fibers 1 and 2 are firmly connected together and their disconnection is prevented. Also, using the glass pipe 8 facilitates performing the connection work of optical fibers 1 and 2.

Figure 4C:
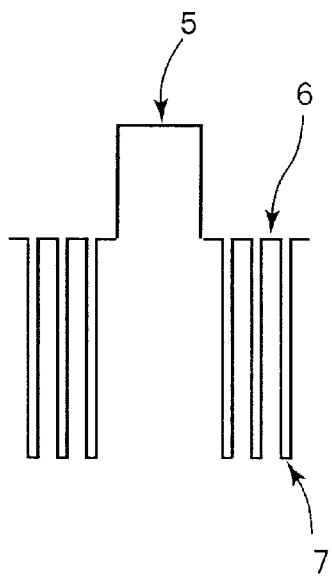

Consequently, despite the differences in the mechanism for guiding light between the optical fibers 1 and 2 as described above, the refractive indices of the connected end faces of optical fibers 1 and 2 become approximately coordinated. That is, before the matching oil M is injected to the hollow core region 5, at the end face of the optical fiber 2 that is to be connected with the optical fiber 1, the refractive index of the hollow core region 5 has an equivalent refractive index profile which is smaller than the refractive index of the cladding region 6, as shown in FIG. 4B. On the other hand, when the matching oil M is injected into the hollow core region 5, at the end face of the optical fiber 2 that is connected with the optical fiber 1, the refractive index of the hollow core region 5 has an equivalent refractive index profile which is greater than the refractive index of the cladding region 6 as shown in FIG. 4C. Consequently, the coordination of the power distribution of the light at the connected end faces of the optical fibers 1 and 2 are improved. Accordingly, the connection loss of the optical fibers 1 and 2 is reduced.

Moreover, since the cross-sectional area of the matching oil M on a plane which is perpendicular to the longitudinal axis of the optical fiber 2 decreases continuously as it is more distanced from the end of the optical fiber 2 connected to the optical fiber 1, in accordance with which the refractive index profile of the hollow core region 5 gradually changes. Consequently, an increase in loss due to rapid changes of the refractive index profile of the hollow core region 5 is restrained.

Also, since the core region 3 is formed of silica glass and the hollow core region 5 consists of gas, merely butting the optical fiber 1 and the optical fiber 2 causes a significant difference in refractive indices at the interface of the connection between the core region 3 and the hollow core region 5, and the reflection of light at the connected end faces of the optical fibers 1 and 2 increases. On the other hand, in the present embodiment, since refractive indices of the core region 3 and the hollow core region 5 are made approximately equal at their connected end faces by the matching oil M injected into the hollow core region 5, the reflection of light at the connected end faces of the optical fibers 1 and 2 also is reduced.

Figure 5A:
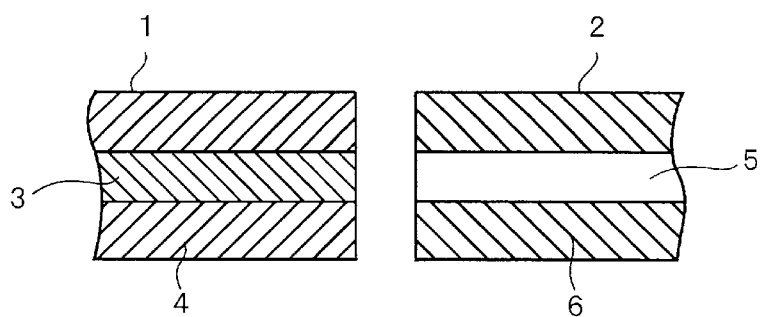
FIGS. 5A through 5E show other methods for connecting the two optical fibers of FIG. 1.
Figure 5B:
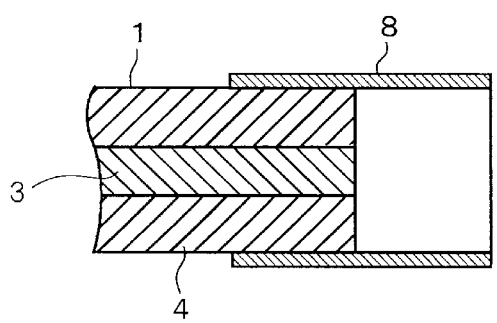

Another method for connecting the optical fiber 1 and the optical fiber 2 will be explained with reference to FIGS. 5A through 5E. First, the optical fibers 1 and 2 are prepared (FIG. 5A). Next, one end portion of the optical fiber 1 is inserted into a glass pipe 8 (FIG. 5B).

Figure 5C:
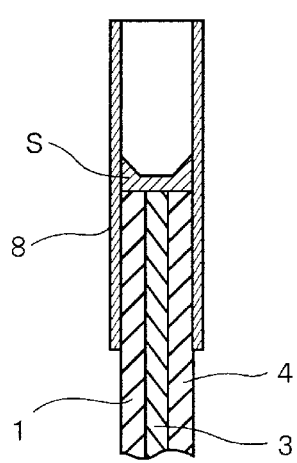

Then, in a state in which the opening of the glass pipe 8 is turned up, an ultraviolet-curable resin S is injected into the glass pipe 8 from the opening of the glass pipe 8 (FIG. 5C). The ultraviolet-curable resin S collects onto the end face of the optical fiber 1. The ultraviolet-curable resin S is a refractive index matched substance whose refractive index is greater than that of the material forming the cladding region 6 of the optical fiber 2. The refractive index of the ultraviolet-curable resin S is also such a refractive index as to allow the power distributions of light to become approximately equal to each other at the connected end faces of the optical fibers 1 and 2.

Figure 5D:
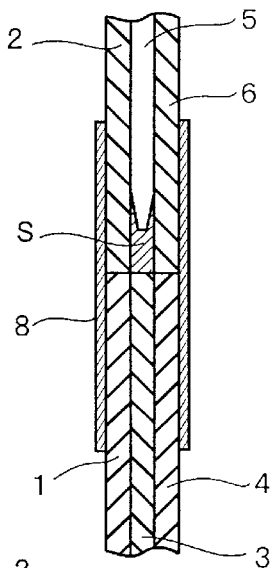

Subsequently, one end portion of the optical fiber 2 is inserted into the opening of the glass pipe 8 such that the end faces of the optical fibers 1 and 2 are butted. Consequently, the ultraviolet-curable resin S is injected into the hollow core region 5 at and near the connecting end faces of the optical fibers 1 and 2 (FIG. 5D).

At this stage, the ultraviolet-curable resin S is not yet hardened, and can be put into the hollow core region 5 easily. At the same time, ultraviolet-curable resin S is also filled between the cladding region 4 and the cladding region 6. Because of the surface tension of the ultraviolet-curable resin S, the cross-sectional area of the ultraviolet-curable resin S on a plane that is perpendicular to the hollow core region 5 decreases continuously as it is more distanced from the connecting end portion.

Figure 5E:
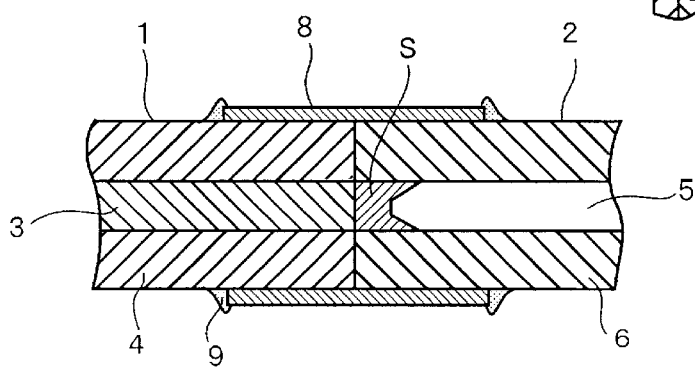

Subsequently, ultraviolet rays are irradiated from outside the glass pipe 8 to the connecting portions of the optical fibers 1 and 2 so as to harden the ultraviolet-curable resin S. Then, the end portions of the glass pipe 8 and the fibers 1 and 2 are fixed with an adhesive 9 (FIG. 5E). As the ultraviolet-curable resin S hardens, the properties of the resin S stablizes, and the optical fibers 1 and 2 are more firmly connected together, and the fiber characteristics after connection are more stably maintained.

Figure 6:
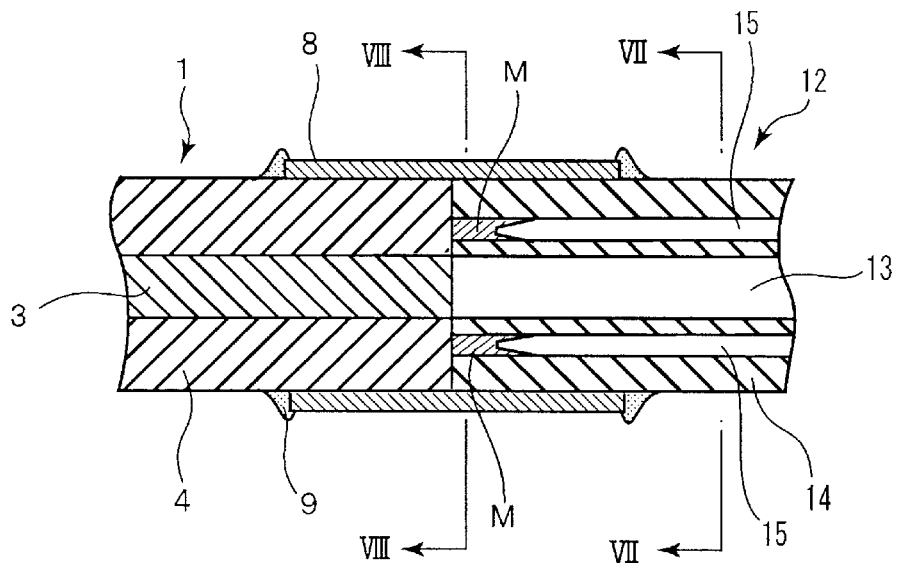
FIG. 6 shows a sectional view of a connected part of optical fibers in an optical transmission line according to a second embodiment of the present invention.

Next, a second embodiment of a connected part of optical fibers in an optical transmission line according to the present invention will be explained. FIG. 6 shows a sectional view of a connected part of optical fibers according to the present embodiment. The connected part of optical fibers according to the present embodiment is concerned with a connection between an optical fiber 1 and an optical fiber 12.

Figure 8A:
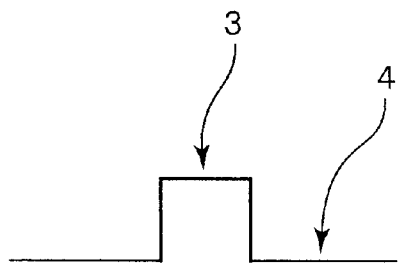
FIGS. 8A through 8C show the refractive index profiles of the two optical fibers of FIG. 6.
Figure 8B:
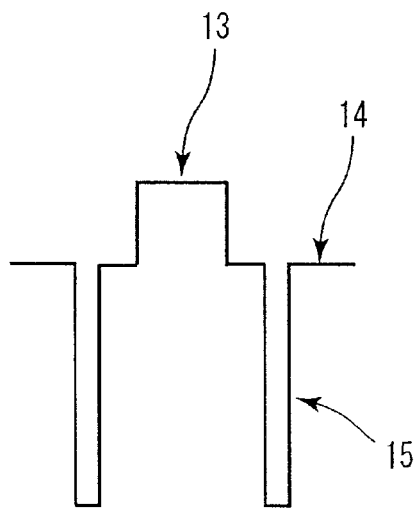

The optical fiber 12 is formed of silica glass, and consists of a core region 13 and a cladding region 14 that surrounds the core region. The core region 13 is doped with a dopant such as $GeO_2$, and the refractive index of the core region 13 is greater than that of the cladding region 14 (FIG. 8B).

Figure 7:
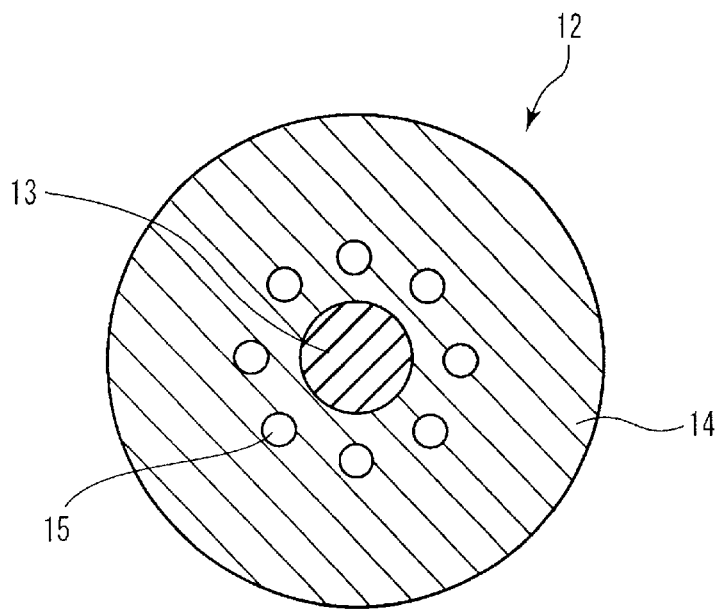
FIG. 7 is a sectional view taken along the line VII—VII of FIG. 6.

A plurality of hollow regions 15 which extend along the optical fiber 12 are formed around the core region 13 in the cladding region 14 as shown in FIG. 7. A reduction of the influence of a nonlinear optical effect and a large variation of the waveguide dispersion become possible by forming such hollow regions 15 in the cladding region 14.

The optical fiber 12 is connected to the optical fiber 1 by a method using matching oil M as shown in FIG. 6. That is, the matching oil M is injected into hollow regions 15 at the connecting end portion to be connected with the optical fiber 1. The refractive index of this matching oil M is approximately equal to the refractive index of a medium that forms the cladding region 14. Subsequently, one end portion of the optical fiber 1 and the end portion of the optical fiber 12 where the matching oil M is injected are inserted into the glass pipe 8 such that the end faces of the optical fibers 1 and 12 are butted. Consequently, the matching oil M filled in the connecting end portion of the hollow regions 15 contacts the connecting end face of the cladding region 4.

The connection between the optical fibers 1 and 12 may be performed by a method shown in FIGS. 5A through 5E using the ultraviolet-curable resin S. Also, the refractive index of the matching oil M is acceptable if it is greater than that of the hollow region 15.

Figure 8C:
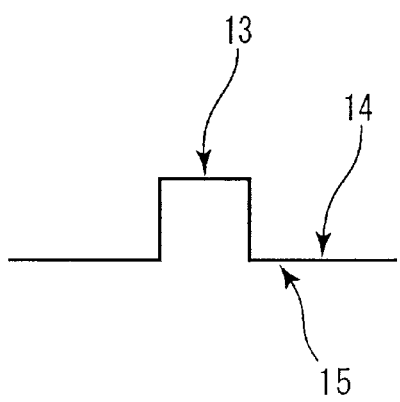

As a result of connecting the optical fibers 1 and 12, the equivalent refractive index profile of the optical fiber 12 at the end face connected with the optical fiber 1 becomes approximately equal to the refractive index profile (FIG. 8A) of optical fiber 1 as shown in FIG. 8C. Accordingly, the power distribution of light at the connected end faces of the optical fibers 1 and 12 becomes approximately equal, and the connection loss of the optical fibers 1 and 12 is reduced.

The present invention is not limited to the above embodiments. For example, the present invention can be applied to a connection between an optical fiber having a hollow core region and an optical fiber having hollow regions only in the cladding region. Furthermore, it is possible to apply the present invention to a connection between optical fibers each having a hollow core region, and also to a connection between optical fibers each having hollow regions only in the cladding region.

What is claimed is:

1. An optical transmission line including a connected part where a first optical fiber and a second optical fiber are connected, the optical transmission line being characterized in that:

the first optical fiber has a first core region and a first cladding region;

the second optical fiber has a second core region and a second cladding region;

a hollow region which extends along the second optical fiber is formed in at least one of the second core region or the second cladding region; and a refractive index matched substance having a refractive index which is greater than the refractive index of the hollow region is contained in a portion of the hollow region at the connected part between the first optical fiber and the second optical fiber.

2. An optical transmission line including a connected part according to claim 1, wherein the cross-sectional area of the substance on a plane which is perpendicular to the longitudinal axis of the second optical fiber decrease continuously as it is more distanced from the connected end face of the second optical fiber.

3. An optical transmission line including a connected part according to claim 1, wherein the substance is liquid.

4. An optical transmission line including a connected part according to claim 1, wherein the substance is in a liquid state at the time of connection work and is hardened thereafter.

5. An optical transmission line including a connected part according to claim 4, wherein the hardened substance is also filled between the connected end of the first optical fiber and the connected end of the second optical fiber.

6. An optical transmission line including a connected part according to claim 1, wherein the connected part is provided with a reinforcement member.

7. An optical transmission line including a connected part according to claim 1, wherein the second core region has a hollow structure; and the refractive index of the substance is equal to or greater than that of the medium which forms the second cladding region.

8. An optical transmission line including a connected part according to claim 1, wherein a plurality of hollow regions are formed in the second cladding region around the second core region.

9. An optical transmission line including a connected part according to claim 1, wherein the first optical fiber and the second optical fiber are formed of silica glass.

10. A method of connecting optical fibers wherein:

a first optical fiber having a first core region and a first cladding region and a second optical fiber having a second core region and a second cladding region are prepared;

one or more hollow regions which extend along the second optical fiber is formed in at least one of the second core region or the second cladding region;

a refractive index matched substance having a refractive index which is greater than the refractive index of the hollow region is contained in a portion of the hollow region at the connected part between the first optical fiber and the second optical fiber; and the first optical fiber and the second optical fiber are connected.

* * * * *